(12) United States Patent
Draper

(10) Patent No.: US 7,542,495 B1
(45) Date of Patent: Jun. 2, 2009

(54) CORROSION RESISTANT COOLED ACOUSTO-OPTIC DEVICES

(75) Inventor: Michael J. Draper, Ilminster (GB)

(73) Assignee: Gooch and Housego PLC, Ilminster Somerset (GB)

( * ) Notice: Subject to any disclaimer, the term of this patent is extended or adjusted under 35 U.S.C. 154(b) by 0 days.

(21) Appl. No.: 11/938,449

(22) Filed: Nov. 12, 2007

(51) Int. Cl.
*H01S 3/04* (2006.01)
(52) U.S. Cl. .............................. 372/34; 372/13; 372/35
(58) Field of Classification Search .................... 372/34, 372/35
See application file for complete search history.

(56) References Cited

U.S. PATENT DOCUMENTS

| | | | | |
|---|---|---|---|---|
| 4,586,185 A * | 4/1986 | DeWilde et al. | ............... | 372/34 |
| 4,847,852 A * | 7/1989 | Yatsiv et al. | .................. | 372/82 |
| 2003/0086447 A1 | 5/2003 | Young et al. | | |

FOREIGN PATENT DOCUMENTS

WO 01/63666 A1 8/2001

* cited by examiner

*Primary Examiner*—Dung T Nguyen
(74) *Attorney, Agent, or Firm*—Patents on Demand, P.A.; Neil R. Jetter

(57) ABSTRACT

A corrosion resistant fluid cooled acousto-optic (AO) device includes an AO interaction medium and a piezoelectric transducer affixed to the AO medium. A cooling arrangement is thermally coupled to the AO medium and includes a first material, and at least one cooling conduit in thermal contact within the first material formed from a second different material having an inlet and an outlet coupled thereto. The conduit provides a channel having an inner surface for flowing a coolant fluid therethrough, wherein the conduit includes a continuous corrosion resistant material layer over its entire area of the inner surface. The first material provides a specific acoustic impedance closer to a specific acoustic impedance of the AO medium as compared to the corrosion resistant material, and a bulk thermal conductivity at 25 C of at least 75 W/m·K.

20 Claims, 6 Drawing Sheets

US 7,542,495 B1

CORROSION RESISTANT COOLED ACOUSTO-OPTIC DEVICES

FIELD OF THE INVENTION

The present invention relates to acousto-optical devices having corrosion resistant fluid-based cooling arrangements.

BACKGROUND OF THE INVENTION

Acousto-optic (AO) technology utilizes diffraction effects caused by acoustic strain waves in a block of suitable material (referred to as the AO interaction medium) to effect control over electromagnetic waves. Typically a strain wave is launched into a suitable AO material capable of supporting both the strain wave and the optical wave in the same region. The acoustic strain wave imparts a perturbation to the index of refraction in the AO medium relating to the propagation of the electromagnetic wave. By controlling the amplitude of the acoustic strain wave, control over the electromagnetic wave can be achieved.

Heat generation in AO devices is known arise from three main sources, optical absorption, acoustic absorption and Ohmic heating at the transducer. Minimizing these sources of heat in order to maintain device performance and stability is generally an AO device design goal.

Both optical absorption and acoustic absorption generate heat within the AO medium and must be thermally conducted out of the material. This conduction process is limited by the thermal conductivity of the AO medium and the thermal conductivity of the surrounding heat-sink material. Once a specific AO medium and acoustic propagation mode has been chosen, the optical absorption and acoustic absorption are fixed. The third heat source, Ohmic heating, is generally controlled by good transducer design.

In typical AO Q-switching devices, the radio frequency (RF) power applied to the acoustical transducer required to produce enough diffraction to stop the laser oscillating is generally at least on the order of several tens of Watts. In such cases, air cooling is no longer viable and water cooling generally becomes necessary.

Water cooling is both for the removal of heat from acoustic absorption and Ohmic heating. This absorption of the acoustic power after the passage of the acoustic wave through the AO medium is vital to the correct operation of the AO Q-switch. If the acoustic power is not all absorbed, then some will be reflected, where it will encounter the laser beam a second time, generally after a delay of several micro-seconds, and thus can cause diffraction a second time. This effect is unwanted, and generally leads to unreliable effects ("after-pulsing") and lack of control of the laser. Acoustic absorbers are known in the art to reduce acoustic reflection to some degree.

Acoustic energy can be absorbed in the AO medium by virtue of its intrinsic acoustic absorption. This results in heat generation within the AO medium which should be subsequently be conducted out of the AO medium in order to limit any temperature rise to an acceptable level. As noted above, in typical AO devices, the acoustic power in the devices is typically tens of Watts. If all of this power is converted to heat within the AO substrate (and then removed by thermal conduction) a significant temperature gradient will result across the AO medium. Significant temperature gradients are known to degrade properties of the AO device. It is thus generally better to instead try and extract the acoustic energy from the AO material, such as into an acoustic dump/heat sink which is cooled by forced air/conduction/water cooling.

Absorption of the acoustic energy directly in the heat sink material can be advantageous for thermal management of the overall structure as the thermal conductivity of the heat-sink material can be chosen to be significantly higher than that of the AO medium. A number of materials are available for this type of acousto-optic interaction. For high power lasers operating in the region of 1 μm, the main choices are generally crystal quartz and fused silica. Fused silica is used as an example below to explain the main design steps and considerations.

For stable performance of AO devices, and in particular some AO Q-switches, the heat generated during operation must be extracted and the device temperature rise limited to acceptable levels. A very common method of cooling is to attach metal cooling plates to the AO medium in positions which will not interfere with the straight-through passage of the optical beam from its input face to output face of the AO crystal. The plates are generally cooled by flowing water through enclosed channels formed in the cooling plates. A pump generally maintains the flow of water. The mechanical, thermal and acoustic properties of the chosen metal plate material are important to achieve optimum device performance. The particular material is generally chosen based on a combination of these properties. In particular, the key cooling-related parameters of the material are the specific acoustic impedance ($Z_O$) and the thermal conductivity (K).

As known in the art, if two different materials are joined together at a plane interface, and an acoustic wave is propagating in one of them such that it encounters the interface region, the amount of acoustic power reflected at the interface is known to depend on the acoustic impedance of the two layers, $Z_{O,1}$, $Z_{O,2}$. If $Z_{O,1}=Z_{O,2}$, then in general there will be no reflection at this interface, otherwise the proportion of acoustic power reflected will depend on the ratio $Z_{O,1}/Z_{O,2}$. Thus, if an AO interaction medium of characteristic impedance $Z_{O,1}$ is joined to a heat-sink/acoustic dump material having a characteristic impedance $Z_{O,2}$ there will be a possibility of complete absorption of the acoustic energy directly in the heat sink only if the two acoustic impedances are equal. It is noted that for a particular material, $Z_O=\rho V$, where $\rho$ is the density of the material and V is its acoustic velocity. Thus, even if the AO interaction medium and heat sink are different materials (e.g. silica and aluminum, respectively), as long as the product of $\rho$ and V in each is the nearly same, the heat sink will reflect a minimal amount of acoustic power back into the AO medium, as required.

Considering mechanical, thermal and acoustic properties of the cooling plate material often results in the selection of aluminum or a similar material or alloy (e.g. aluminum alloy). A common problem with aluminum comprising plates is the onset of corrosion (oxidation) in the cooling channels caused by the interaction of the aluminum with the water and with other metals that may be present within the water system. It is difficult to stop this corrosion by altering the pH of the cooling fluid, because aluminum has the unusual property of being vulnerable to corrosion in neutral, as well as both low pH and high pH aqueous solutions.

The major effects of the corrosion include leaks at joints, injection of corrosion products into the fluid flow, blockage of cooling channels, and reduced operating lifetime. All of these factors can result in deterioration in system performance and can result in the failure of the Q-switch (due to insufficient cooling), or the failure of other components utilizing the same coolant circuit.

A number of "solutions" have been disclosed that attempt to minimize corrosion-related problems. All known solutions have at least one significant shortcoming. Several common "solutions" are described below.

It is common practice for AO devices, including AO-based Q-switches, to metal plate the cooling blocks with a corrosion resistant material with the intention of creating a barrier layer between the corrosion sensitive cooling block material (e.g. aluminum alloy) and the surrounding environment. For example an anodized or an electroless plated nickel finish can be applied to aluminum and its alloys. Although the intent is to protect the both the interior and exterior surfaces of the cooling channels from oxidation associated with coolant flow, due to the nature of plating processes, although the exterior surfaces are generally uniformly plated, the interior channel surfaces are not fully covered with plating material due to the difficulty in getting the plating material to extend down the inside of the channels. The inability to properly plate in the interior surfaces of the cooling channels plagues both electrolytic and non-electrolytic plating processes. As a result, metal plating provides limited effectiveness in terms of preventing corrosion. Moreover, coolant flow can cause erosion-corrosion of the barrier material that is present inside the cooling channels. In this process, small particulates in the coolant flow continually impinge on the inner walls of the cooling channels, thus eroding the plating and expose the underlying metal which then corrodes at an even faster rate. Moreover, heat is less efficiently extracted in the plated arrangement because the corrosion resistant plate material which ends up on the outside surfaces (sides of the block) of the cooling block material and thus becomes in physical contact with the optical medium upon assembly has a smaller K as compared to the bulk coolant material (e.g. aluminium).

Materials other than Al or Al alloys that are more resistant to corrosion have been used and a good deal of success has been achieved. However, although such alternate materials have been successful in delivering a Q-switch design more resistant to corrosion, the overall device performance has been limited. The limitation arises because the good mechanical, thermal and acoustic properties are not present simultaneously. Typically, heat is less efficiently extracted because the corrosion resistant plated material has inferior properties (smaller K) as compared to most alternate heat-sink/acoustic dump materials (e.g. aluminum). If less heat can be extracted then it follows that less RF drive power can be applied to the device and the device efficiency is compromised (device efficiency being proportional to the electrical drive signal strength).

Increased coolant flow rate is a possible solution but this option is often not available. In addition increased coolant flow comes at an additional cost, such as larger and more expensive water pumps.

Cooling plates are often made from solid pieces of metal which have flow channels ('ways') drilled through them to form continuous channels which carry the coolant from one side of the plate to the other. In drilling the 'ways' it is necessary to drill holes deep into the material which are later blocked with plugs near the surface in order to make one or more leak-free continuous cooling channels. A significant problem with coolant plates having ways is leakage of coolant at these plugged holes either due to poor sealing or due to local corrosion.

What is a needed is a corrosion resistant fluid cooled arrangement for AO devices which provides high thermal conductivity and an acoustic impedance close to the value of acoustic impedance for the AO medium. In addition, such an arrangement should be a relatively low-cost arrangement.

SUMMARY

A corrosion resistant fluid cooled acousto-optic (AO) device includes an AO interaction medium and a piezoelectric transducer affixed to the AO medium. A cooling arrangement is thermally coupled to the AO medium and includes a first material, and at least one cooling conduit in thermal contact within the first material formed from a second different material having an inlet and an outlet coupled thereto. The conduit provides a channel having an inner surface for flowing a coolant fluid therethrough, wherein the conduit includes a continuous corrosion resistant material layer over its entire area of the inner surface. The first material provides a acoustic impedance closer to a specific acoustic impedance of the AO medium as compared to the corrosion resistant material, and a bulk thermal conductivity at 25 C of at least 75 W/m·K.

In one embodiment, the cooling arrangement is disposed on both sides of the AO medium. In embodiments of the invention a specific acoustic impedance between the first material and the AO medium is within 50%. In one embodiment, the corrosion resistant material can comprise stainless steel and the first material can comprise aluminum or an aluminum alloy.

A thin metal oxide layer (typically 10 to 30 A, of aluminum oxide in one embodiment) is generally present on the surface of the first material. Such oxide is not present in a plated arrangement. The corrosion resistant layer can comprise the entire conduit and be in a thickness range of 0.1 mm to 1 mm.

In one embodiment, the cooling conduit is an integral conduit surrounded by and in physical contact with the first material except at distal ends of the cooling conduit. In another embodiment the conduit is <10% of a total mass of the cooling arrangement.

In one embodiment the cooling arrangement comprises a layer of first material in contact with the AO medium on at least one side of the AO medium, and a layer of the second material having at least one of the channels formed therein on the layer of first material, wherein the second material comprises the corrosion resistant material. In this embodiment the cooling arrangement can comprises a sandwich arrangement having the first and second layer on opposite sides of the AO medium. In yet another embodiment the cooling arrangement comprises an article of the first material having at least one formed channel accepting region, wherein the channel is formed entirely from the corrosion resistant material, and the herein the channel is in pressed in contact with the channel accepting region to effect thermal contact between the channel and the article.

The AO device can comprises a Q-switch, a modulator, a frequency shifter, an acousto-optic tuneable filter (AOTF) or a deflector. In the Q-switch embodiment the system can comprise a Q-switch laser, further comprising a resonant cavity including a highly reflecting back mirror and a partially reflecting output coupler with a solid state laser with the cavity, wherein the Q-switch is within the cavity.

BRIEF DESCRIPTION OF DRAWINGS

A fuller understanding of the present invention and the features and benefits thereof will be obtained upon review of the following detailed description together with the accompanying drawings, in which.

DETAILED DESCRIPTION

Figure 1:
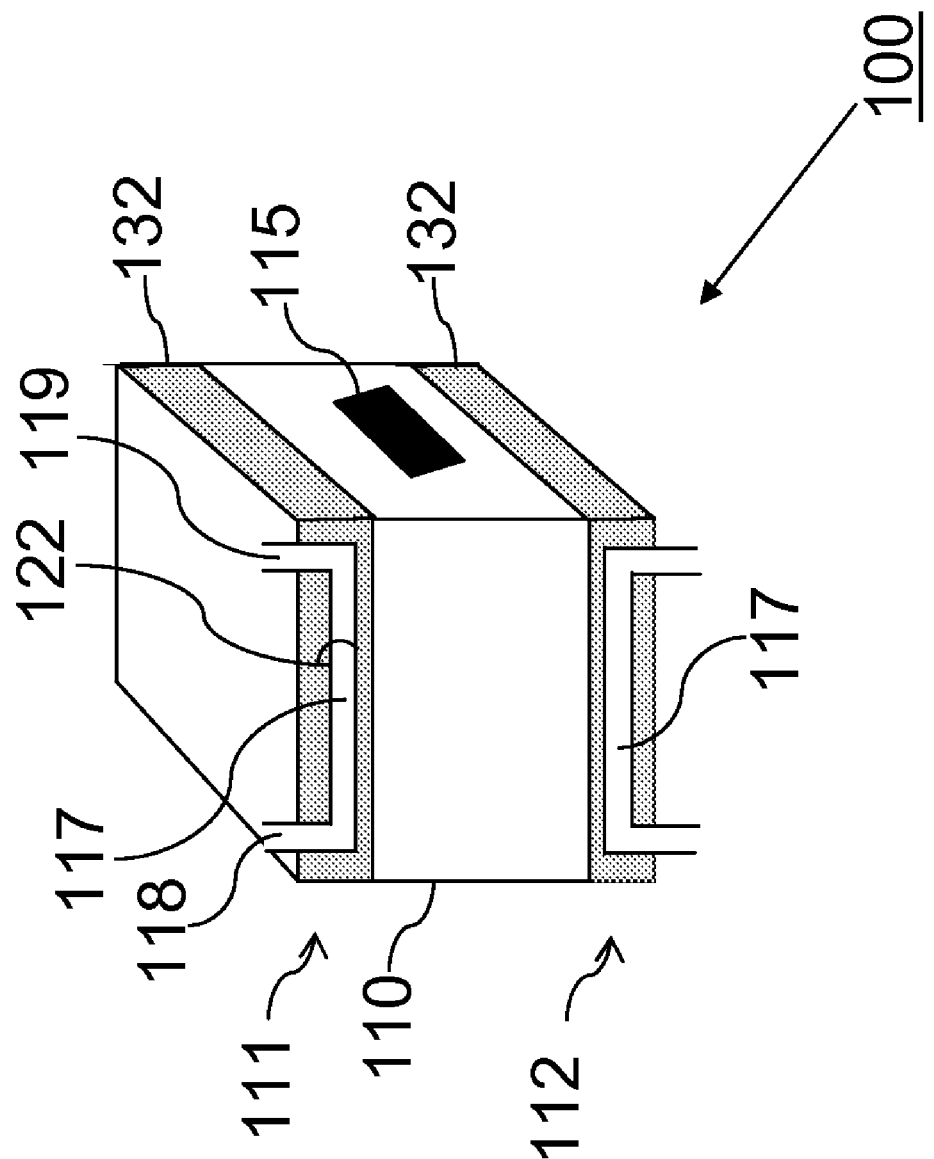
FIG. 1 is a cross section view of a corrosion resistant fluid cooled acousto-optical (AO) device according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, can recognize that the invention can be practiced without one or more of the specific details or with other methods. In other instances, well-known structures or operations are not shown in detail to avoid obscuring the invention. The present invention is not limited by the illustrated ordering of acts or events, as some acts can occur in different orders and/or concurrently with other acts or events. Furthermore, not all illustrated acts or events are required to implement a methodology in accordance with the present invention.

Referring to FIG. 1, a corrosion resistant fluid cooled acousto-optic (AO) device 100 comprises an AO interaction medium 110 and a piezoelectric transducer 115 affixed to the AO medium. A cooling arrangement 111 and 112 is shown thermally coupled, or thermally and acoustically coupled to, opposing sides of the AO medium 110. Although shown on opposing sides of AO medium, in certain generally low power applications, a single cooling arrangement on only one side of AO medium 110 can provide sufficient cooling.

The cooling arrangements 111 and 112 each comprise a first material 132 which functions as both a heat sink and an acoustic matching material, and at least one cooling conduit 117 in thermal contact with the first material formed from a second different material, having an inlet 118 and an outlet 119 coupled thereto. Conduit 117 provides a channel having an inner surface 122 for flowing a coolant fluid therethrough. At least the inner surface 122 of the cooling conduit 117 is formed from a corrosion resistant material. The corrosion resistant material provides a continuous layer over the entire area of the inner conduit surface. In one embodiment, substantially the entire cooling conduit 117 is formed from a corrosion resistant material. First material 132 comprises an AO medium matching material which is in thermal, or thermal and acoustic contact, with the AO medium 110. The AO device can comprise a variety of AO devices, including a Q-switch, a modulator, a frequency shifter, an acousto-optic tuneable filter (AOTF), or a deflector.

Materials for first material 132 generally perform best when they provide both high thermal conductivity ($\kappa$) and a good acoustic impedance match to the acoustic impedance of the AO medium 110. The first material 132 in its heat sink function provides a bulk thermal conductivity at 25 C of $\geqq 50$ W/m·K, such as >100 W/m·K, or in another embodiment $\geqq 150$ W/m·K. The first material in its matching material function also provides a specific acoustic impedance closer to a specific acoustic impedance of the AO medium 110 as compared to the corrosion resistant material 122. As known in the art, acoustic impedance generally has different shear (S) and longitudinal (L) values. Moreover, at any non-normal incidence of the acoustic wave at the boundary of the AO medium with the heat-sinking first material 132, the most likely outcome is that some acoustic energy will be coupled out (as S and as L modes) and some acoustic energy will remain inside of the material again as both S and L modes. This applies even if the incident wave is purely S (or purely L). After a few reflections at the boundaries there is likely to be a mixture of S and L modes within the AO medium which will be required to be coupled out into the heat-sink. The specific acoustic impedance match between the first material 132 and the AO medium 110 is generally within 50%, such as within 40%, or within 30% for at least one, and generally for both the respective S and L acoustic impedances. Percentages as used herein are measured with reference to the higher value. For example, if the respective acoustic impedance values are $13\times10^6$ and $18\times10^6$, the difference is 5/18=28%.

The thermal conductivity $\kappa$ and acoustic impedance match can be merged into a figure of merit (M*) for the first material 132/AO medium 110 combination. M* can be defined as the ratio of the thermal conductivity to the average (for S and L mode) relative acoustic impedance. The relative acoustic impedance is defined as the ratio of acoustic impedance of heat sinking first material 132 to the acoustic impedance of the particular AO material when the heat-sink impedances >AO substrate impedances. For the acoustic impedance of the AO medium 110>than that of the first material 132, the relative acoustic impedance is the inverse ratio, so that this ratio should never be less than 1.0 when used to generate M*. In one embodiment, M*$\geqq 67$ W/m·K, such as when K=100 W/m·K and the average acoustic impedance ratio is $\leqq 1.5$. In another embodiment, M*$\geqq 200$ W/m·K.

Aluminum (and its alloys) are useful as first material 132 for embodiments of the invention based on its low relative cost to other metals, its acoustic impedance being near to the acoustic impedance of common optical mediums, such as quartz, and its relatively high bulk thermal conductivity at 25 C of about 216 W/m·K. Aluminum has a thermal conductivity that is more than an order of magnitude higher as compared to Stainless Steel-321 and Stainless Steel-410. Aluminum alloys may also be used as the first material 132, as well as other relatively low relative cost materials including copper, zinc and brass which provide an acoustic impedance near to the acoustic impedance the AO medium commonly used in AO devices, such as quartz, and a bulk thermal conductivity at 25 C of at least 100 W/m·K. In the case of aluminum and fused silica, the acoustic impedance match provided is about 1.3 for Longitudinal waves and 1.01 for shear waves. The value of 1.01 is based on the values for acoustic velocity and density quoted in the open literature. One having ordinary skill in the art will appreciate that this ratio will depend on a range of parameters, such as variations in density and velocity, particularly in the heat sink materials which tend to have a granular structure.

Although described relative to quartz AO mediums, the present invention may be used with other AO materials. For example, arsenic trisulfide, tellurium dioxide and tellurite glasses, lead silicate, $Ge_{55}As_{12}S_{33}$, mercury(I) chloride, lead (II) bromide can also generally be used.

A variety of corrosion resistant materials for the inner surface 122 of the cooling conduit 117 may be used with the present invention. As defined herein, a corrosion resistant material is a material that is more corrosion resistant than elemental aluminum when coupled to elemental copper via a water electrolyte having a pH of 7 at 25 C. A corrosion resistant family of materials that is used in embodiments of the invention is stainless steel, which is defined herein as an iron-carbon alloy with a minimum of 10.5% chromium content. High oxidation resistance in air at ambient temperature is normally achieved with additions of a minimum of 13% (by weight) chromium, and up to 26% is used for harsh environments. Chromium is known to form a passivation layer of chromium (III) oxide ($Cr_2O_3$) when exposed to oxygen. Other corrosion resistant materials that may be used with the present invention include zinc, nickel, and magnesium, and non-metals including certain ceramics and polymers. In some cases a cooling pipe material made from copper or a copper alloy may be appropriate as this would be an appropriate match to cooling systems comprising mainly copper and copper alloys. In the case of low thermal conductivity corrosion resistant materials, the thickness of the corrosion resistant material is generally reduced as much as possible to facilitate heat transfer to the matching material.

In embodiments of the present invention, an AO device includes an aluminum (or aluminum alloy) heat-sink construction for low cost and enhanced dumping of unwanted acoustic energy. Embedded pipes of a corrosion resistant material such as stainless steel allow water cooling of the AO medium and provide immunity to corrosion which could not be provided by using channels cut into an aluminum or aluminum alloy block.

Embodiments of the present invention thus combine the best relevant properties of a material possessing the required mechanical, thermal and acoustic properties (e.g. aluminum or an aluminum alloy) and the best properties of a second material different from the first material, being a corrosion resistant, for AO devices. In particular, the thermal conductivity of the cooling plate material is as high as possible, and the acoustic impedance should be as close as possible to the value of acoustic impedance for the AO medium.

Three different exemplary embodiments of this approach are described below. In the embodiments described below, the cooling arrangement 111, 112 generally referred to herein as being as plate, is a composite structure utilizing the best relevant properties of each of the materials from which it is made. Although generally referred to as being a plate, cooling arrangements according to the invention can take on a variety of shapes other than plate-like shapes, such as an L shaped section, a U shaped section, or substantially more complex shapes taking advantage of the in-casting process described below.

Figure 2:
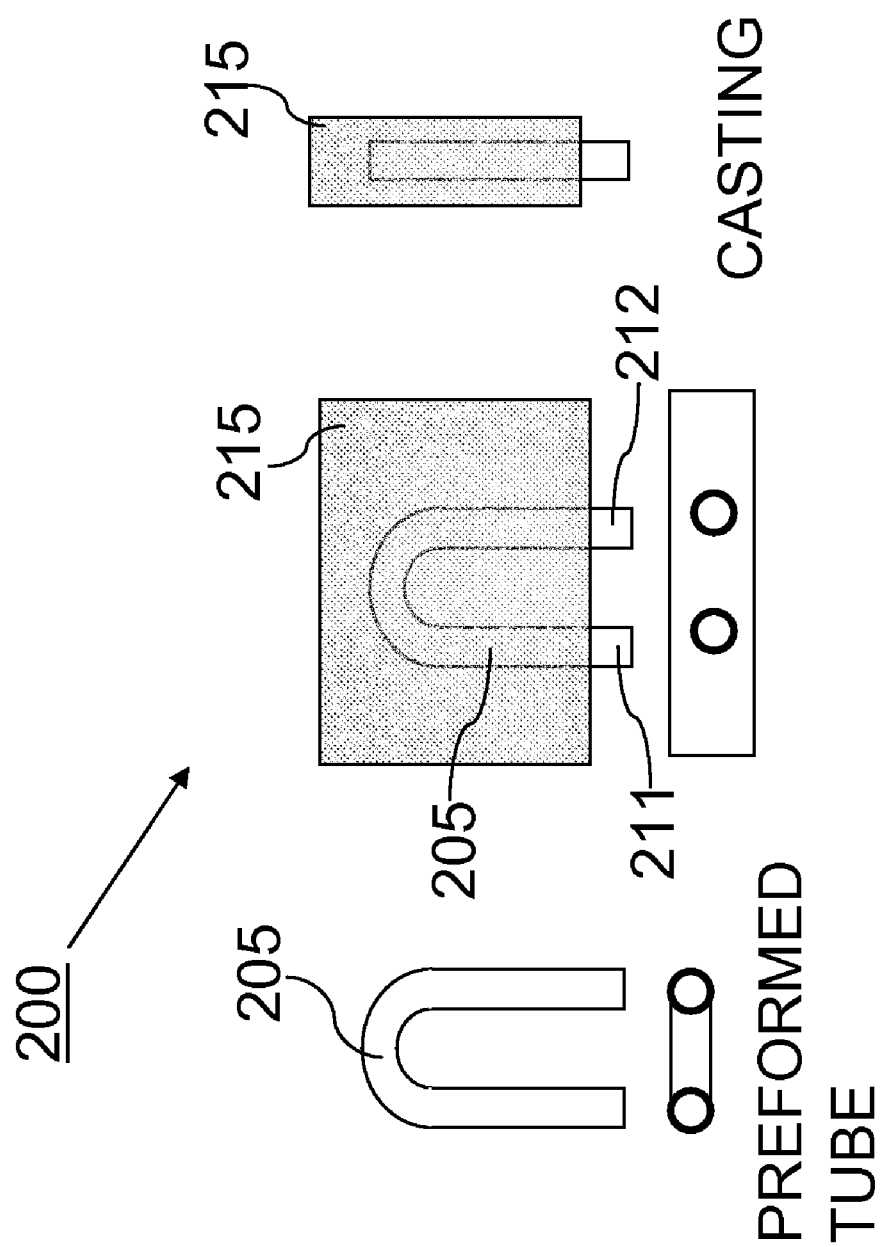
FIG. 2 shows a coolant member according to an embodiment of the present invention formed using an "in-cast" method.

FIG. 2 shows a coolant plate 200 according to one embodiment of the present invention formed using an "in-cast" method. To create this arrangement at least one cooling channel 205 can be obtained commercially or can be otherwise pre-formed in thin walled, corrosion resistant pipe, such as in a thickness range of 0.1 mm to 1 mm. Casting a suitable material into a mold (not shown) containing one or more pre-formed corrosion-resistant pipes 205 forms the cooling plate 200. This is the process of "in-casting", wherein the pipe 205 ends up within the casting material 215. The pipe can include integral regions 211 and 212 which extend outside the cast material 215 to provide a convenient inlet and outlet. The shape of the preformed pipe 205 can be optimised to achieve the desired layout of the final cooling channel. The casting material (e.g. a metal such as Al) is prevented from entering the inside of the pre-formed pipe during the molding process. Upon cooling, the casting can be removed from the mold. The pre-formed pipe 205 now provides a cooling channel though the casting. Because the cooling pipe 205 is generally only a small proportion of overall mass of the heat sink, such as <10% of the overall mass, most of which is composed of the acoustically more favourable material, such as an aluminum alloy, the heat-sink/acoustic dump can also efficiently absorb acoustic energy from the interaction medium or other optical medium with which it is in thermal contact.

As noted above, small sections of cooling pipe 211 and 212 can be left protruding from the casting 215 so that connections can be made to the coolant supply without coolant coming into contact with the casting. In the final design for a typical AO-based device, the cooling plates are attached to the AO interaction medium (silica or quartz) in the conventional way by use of a thermally and acoustically conducting adhesive layer. Such materials used for these layers are well known to those having ordinary skill in the art.

In one embodiment pre-formed pipe 205 can be made from stainless steel and the casting material can be based on aluminum or an alloy of aluminum. The completed cooling plate 200 operates like an aluminum cooling plate with a stainless steel "sleeved" water channel. As well as producing a solution with the advantages of the two individual materials another significant advantage of using the in-cast technique is that the cooling plate having integral (one piece) pipes cannot leak in the 'way' plates with machined water channels described above can leak.

In this embodiment of the invention, casting is made possible due to the significant difference in melting temperature between the pipe material (e.g. stainless steel pipe; high melting point) and the heat sink/acoustic matching material (e.g. aluminum or aluminum alloy; low relative melting point). After casting is complete, post-machining can be applied to shape the casting as required and suitable mounting holes can be drilled/tapped.

Figure 3:
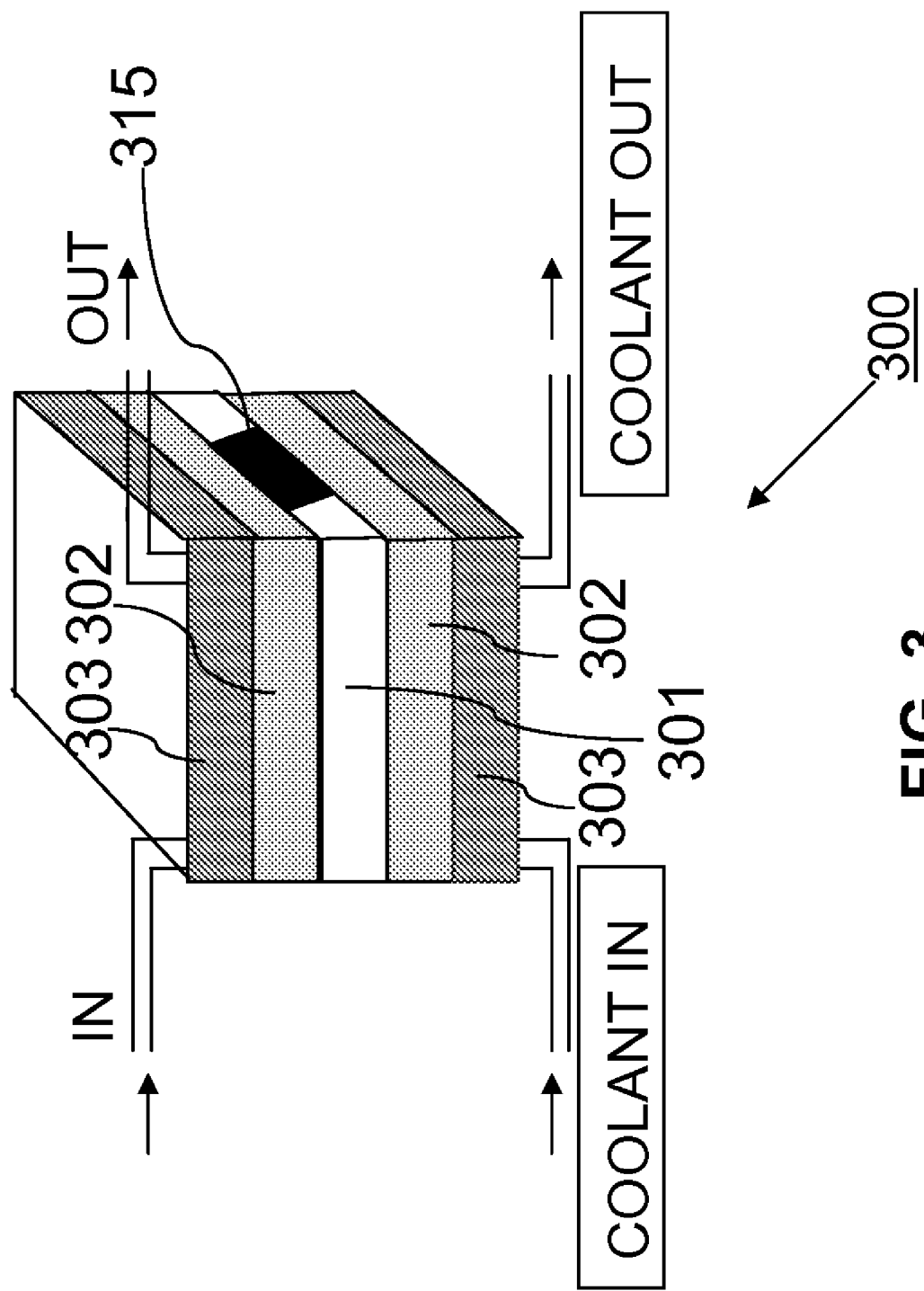
FIG. 3 shows a portion of an AO device comprising an AO medium surrounded by a sandwich cooling arrangement according to another embodiment of the present invention.

FIG. 3 shows a portion of an AO device 300 comprising an AO medium 301 surrounded by a sandwich cooling arrangement according to an embodiment of the present invention. AO medium has a transducer 315 bonded thereto. As noted above, AO device can be a Q-switch, a modulator, a frequency shifter, a tuneable filter (e.g. AOTF), a deflector, or any other type of AO device requiring thermal management. The sandwich cooling arrangement comprises multiple layers which sandwich AO medium 301. On both sides of AO medium 301 is a layer of acoustic impedance matching material 302 (e.g. aluminum or an aluminum alloy) which is also in thermal contact with the cooling plate 303 which includes at least one cooling conduit. The cooling conduit of plate 303 is made from a corrosion resistant material with cooling channels machined in the plate in such a way that they form enclosed channels, with an entry and an exit point for the coolant to flow from coolant in to coolant out shown in FIG. 3.

The exemplary AO device portion 300 is shown being cooled from two sides. However, when maximum cooling capacity is not needed, the device can be cooled from one side. The thickness of each layer and the bond between the respective layers can be set to give the best overall thermal performance. The bonding layers between the AO device and the cooling plates can be formed from thermally and acoustically conductive media as known to those having ordinary skill in the art. The thickness of acoustic impedance matching layers 302 in contact with the AO medium 301 is generally of suitable thickness to convert the majority of acoustic energy into thermal energy. In addition the thickness of these layers should generally be sufficient to give a low transverse thermal resistance. This allows heat generated locally to be spread laterally, improving the conduction into the water cooled components. The concept of heat spreading is well known to those having ordinary skill in thermal management of physical devices subject to heat loads. Thermal spreading increases the effective cross sectional area that is used to remove the heat. This can be significant when transferring heat from a material such as Aluminium used in acoustic impedance matching layer 302 attached to the AO medium 301 to a material such as Stainless Steel used in the form of a corrosion resistant water cooled element 303. A large cross sectional area for heat conduction mitigates against poor thermal conductivity. In certain embodiments of the invention, the coolant plates 303, and the acoustic impedance matching (e.g. aluminum) plates 302 are attached to a fused silica AO interaction medium 301, where the outer cooling plates 303 are made from stainless steel having machined (or formed via a mold or other suitable process) coolant channel(s).

Figure 4:
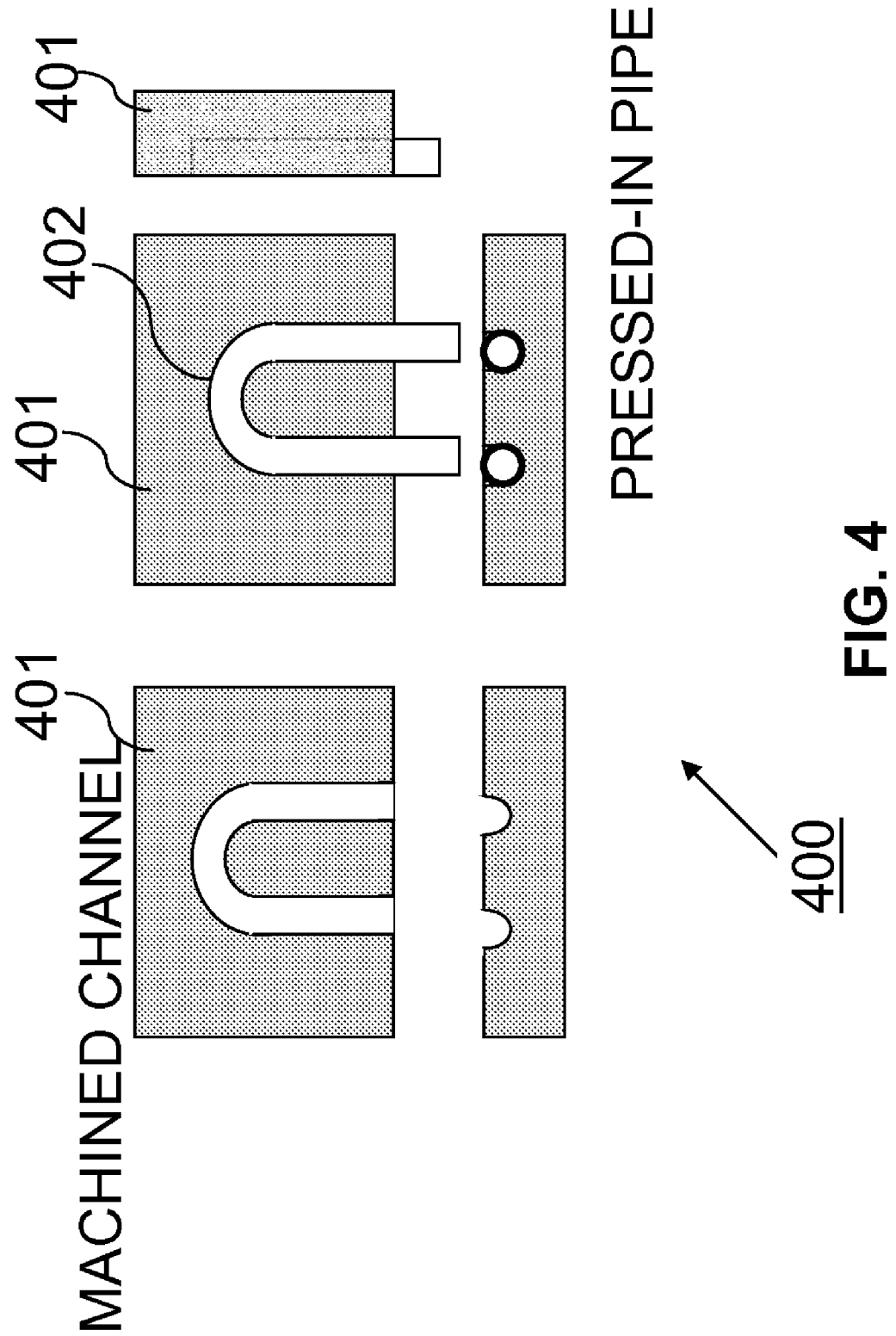
FIG. 4 shows a coolant member according to yet another embodiment of the present invention referred to herein as a pressed-in pipe construction.

FIG. 4 shows a coolant plate 400 according to one embodiment of the present invention referred to as a pressed-in pipe construction. This embodiment machines or otherwise forms (e.g. molds) channels on one side of a optical medium matching material (e.g. aluminum or other suitable material) plate 401 and then presses a corrosion resistant pipe 402 into the channel(s) to effect thermal contact between the pipe and the aluminum. The opposite face of the cooling plate being a continuous surface is contacted to the optical element to effect cooling of the device.

Figure 5:
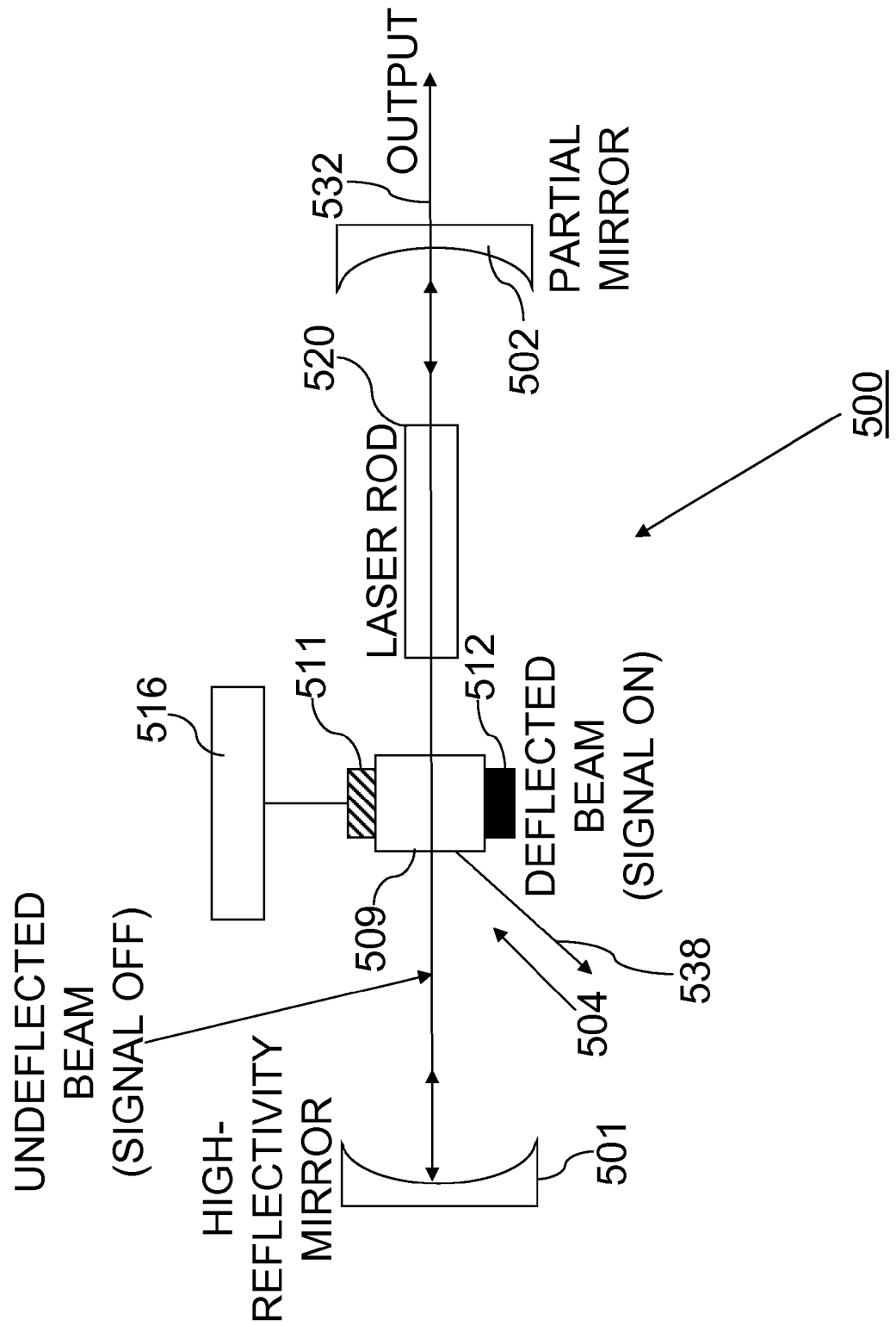
FIG. 5 shows a representation of a pulsed AO Q-switched laser system according to an embodiment of the invention.

FIG. 5 shows a representation of a pulsed AO q-switched laser system 500 according to an embodiment of the invention. Pulsed laser 500 shown is based on a linear resonator cavity design and comprises a high reflecting back mirror 501, a partially reflecting output coupler 502, a solid state laser 520 and a switch comprising active AO Q-switch 504 comprising AO medium having transducer 511 bonded thereto and RF driver 516 coupled to the transducer, and optional saturable absorber 512. Although not shown in FIG. 5, Q-switch 504 includes a cooling arrangement according to the present invention, such as a pair of in-cast coolant plates 200 shown in FIG. 2 oriented in the z-axis of the paper on both sides of AO medium 509. With RF driver 516 on, a deflected beam 538 results in a low Q condition. When RF driver 516 is OFF, Q-switch is returned to a high Q condition which allows laser 520 to provide a pulsed high power laser output 532, such as smooth pulses with a Fourier-Transform-Limited pulse envelope.

Cooling plate technology according to the present invention imparts the advantage of having very high resistance to corrosion in the cooling channels which has not been possible to achieve in other cooling plates arrangements. The invention is generally broadly applicable to devices which uses acoustic energy and need thermal management. For example, besides AO Q-switches, the present invention can also benefit other AO-based devices including modulators, frequency shifters, tuneable filters (e.g. AOTFs) and deflectors. The invention may also be used to benefit acoustic devices, more generally, particularly those which benefit from enhanced cooling. Although not shown, cooling arrangements according to the present invention are generally coupled to pumps, heat exchangers, and/or chillers to form complete cooling systems.

Tests performed have demonstrated that devices made by these methods achieve (or exceed) the performance levels of existing devices using aluminum cooling plates as evidenced by the data presented in the Examples below.

EXAMPLES

It should be understood that the Example described below is provided for illustrative purposes only and does not in any way define the scope of the invention.

Figure 6:
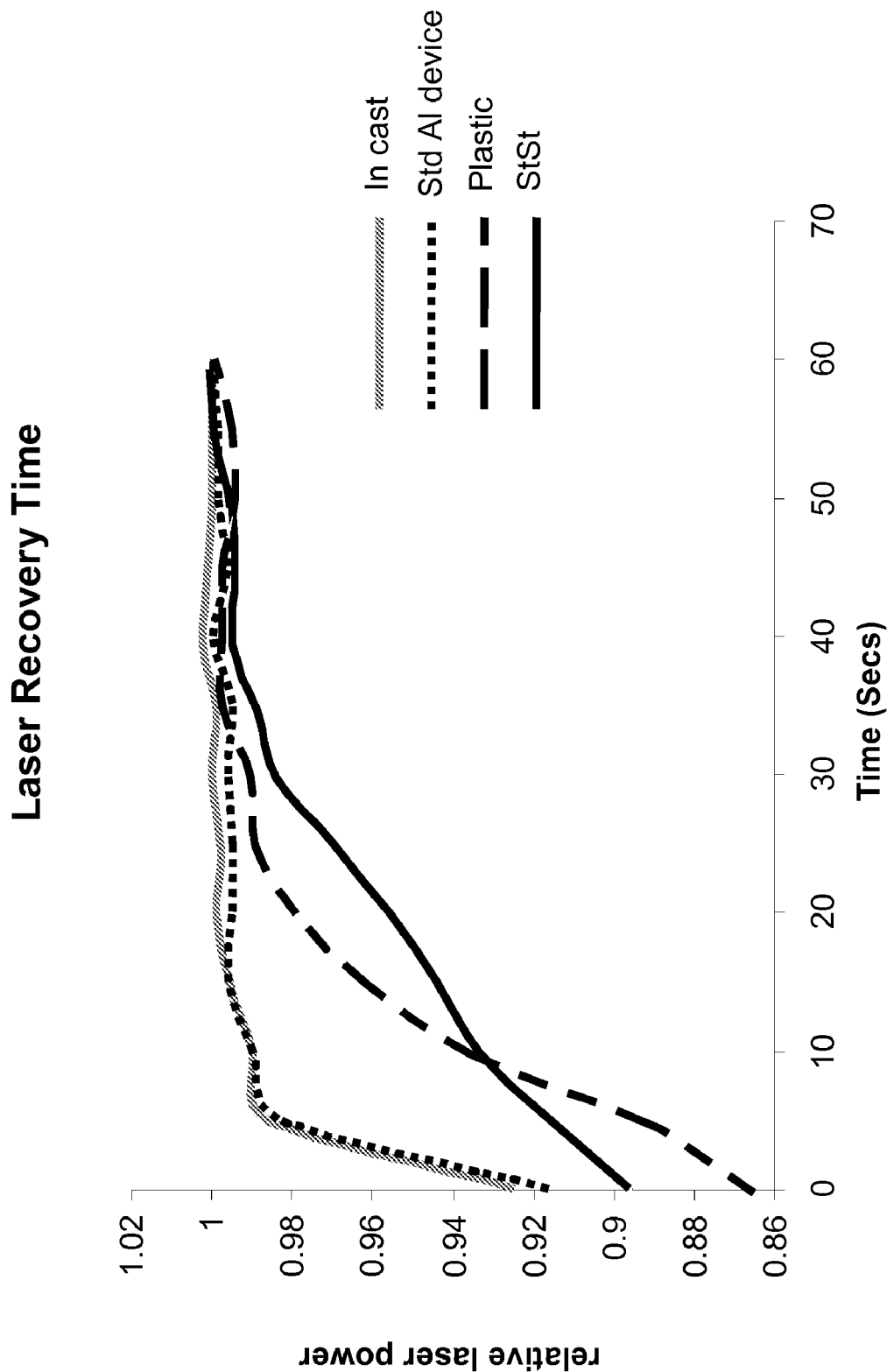
FIG. 6 is laser power output data in a Q-switched system obtained as a function of time for an in-cast cooling device according to the invention as compared to a standard aluminum cooling device, a plastic cooling device, and a stainless steel cooling device. The rate of recovery of the laser performance (in power) is a measure of the cooling effectiveness.

An in-house method was devised to determine the efficacy of various Q-switch cooling schemes, including an in-cast cooling arrangement according to an embodiment of the invention analogous to the device shown in FIG. 2. Results are shown in FIG. 6, and are described below.

General Method

The Q-switch is heated when the RF power is on. This heating together with operation of the cooling circuit results in a steady state condition after a few minutes (e.g. around 5 mins). In this condition, with the Q-switch optimally aligned and CW RF applied, there is no output power from the laser so it is not possible to make a measurement of laser performance. When the RF power is switched off the laser outputs CW power which can be measured. In addition with the RF off, the Q-switch cools under the influence of the cooling circuit. In this state a measurement of power versus time can be made to determine the effect on the laser performance. An RF power of 100 W is the maximum typically used for standard Q-switch device and is the standard power used in the tests performed. This method was found to correlate well with customer findings.

Description for Cooling Devices Used for Tests Reported Herein:

1. Reference Device

As a reference a standard aluminium-based device was used. The device had drilled cooling ways with beta plugs blocking unwanted holes. The plating was electroless nickel (EN) and it is known that these devices corrode because of lack of EN coverage in the cooling bores and possible erosion of the coatings due to particulates in the coolant flow.

2. Stainless Steel Device

The stainless steel device was of the same form as the reference but manufactured entirely from stainless steel. The final surface finish was 'Pickle & Passivate'. These devices do not suffer from corrosion, but do not perform well in laser systems and additionally suffer from leaks at the beta plugs.

3. Plastic protected device

This device was identical to the standard aluminium device described above except for a thin layer (<50 um) of plastic on the interior of the water carrying bores. The plastic layer was applied in vaccuo.

4. In-Cast According to an Embodiment of the Invention

This device looked physically like the reference device. However the cooled sections of the standard housing were replaced by 2 cooling plates made via the in-cast process according to the invention. The device had the same form factor as the other devices listed above, the only difference being that the coolant passes though stainless steel channels in-cast into the cooling sections.

Test Method

1. The Q-switch was inserted in the laser cavity (laser power setting nominally 100 Watts). Water cooling was on, RF off.

2. The RF was switched on and the Q-switch was aligned for optimum Q-switched performance. This ensures that each Q-switch tested is positioned in the laser as it would be in a customer application.

3. The RF was switched off to allow the Q-switch to cool for 2 minutes.

4. The Laser power was adjusted to 100 W. This will be the reference power (Pref).

5. The RF power was switched on. The laser will be in a shut down state (no output power) due to the action of the Q-switch. The laser was kept in this condition for 5 minutes.

6. The RF to the Q-Switch was switched off.

7. The laser CW power output was monitored and logged every 5 seconds up to a total elapsed time of approximately 1 min (or longer if the laser has not recovered to full power).

8. The ratio (measured laser power/reference power) versus time was plotted.

9. The performance for the four devices tested including the in-cast device according to an embodiment of the invention were compared.

Discussion of Results

Now referring to FIG. 6, it is first explained that the RF power into the Q-switch causes thermal distortion of the Q-switch optical element resulting in a reduction of the laser output power. Switching off the RF power, the Q-switch is cooled by the cooling circuit and the associated losses disappear. When the RF has been on for a while a temperature gradient is established in the Q-switch, which reduces the performance of the laser resulting in lower power output. When the RF is switched off the laser comes on in CW mode and a measure of laser output can be made versus time. The rate of recovery of the laser performance is a measure of how effective the cooling is shown in FIG. 6, at zero time (Q-switch at its hottest) the laser performance is best for the in-cast cooling device according to the invention and the standard aluminium device. The in-cast and the standard Aluminium devices perform very similarly from a recovery time point of view. However, as described above, a common problem with aluminum comprising cooling devices is the onset of corrosion (oxidation) in the cooling channels caused by the interaction of the aluminum with the water and with other metals that may be present within the water system. The stainless steel and the device using a plastic material to effect corrosion resistance were both found to perform poorly.

It is to be understood that while the invention has been described in conjunction with specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

I claim:

1. A corrosion resistant fluid cooled acousto-optic (AO) device, comprising:
   an AO interaction medium and a piezoelectric transducer affixed to said AO medium, and
   a cooling arrangement thermally coupled to said AO medium, said cooling arrangement comprising a first material, and at least one cooling conduit thermally contacting said first material formed from a second different material having an inlet and an outlet coupled thereto, said conduit providing a channel having an inner surface for flowing a coolant fluid therethrough, wherein said conduit includes a continuous corrosion resistant material layer over its entire area of said inner surface,
   wherein said first material provides a specific acoustic impedance closer to a specific acoustic impedance of said AO medium as compared to said corrosion resistant material, and a bulk thermal conductivity at 25 C of at least 75 W/m·K.

2. The AO device of claim 1, wherein said cooling arrangement is disposed on opposite sides of said AO medium.

3. The AO device of claim 1, wherein a specific acoustic impedance between said first material and said AO medium is within 50%.

4. The AO device of claim 1, wherein said corrosion resistant material comprises stainless steel and said first material comprises aluminum or an aluminum alloy.

5. The AO device of claim 1, further comprising a thin oxide layer between said first material and said corrosion resistant material.

6. The AO device of claim 1, wherein a thickness of said corrosion resistant layer is at least 0.1 mm thick.

7. The AO device of claim 1, wherein said cooling conduit is an integral conduit surrounded by and in physical contact with said first material except at distal ends of said cooling conduit.

8. The AO device of claim 1, wherein said conduit is <10% of a total mass of said cooling arrangement.

9. The AO device of claim 1, wherein said conduit is entirely formed from said corrosion resistant material.

10. The AO device of claim 1, wherein said cooling arrangement a layer of said first material in contact with said AO medium on at least one side of said AO medium, and a layer of said second material having at least one of said channels formed therein on said layer of first material, wherein said second material comprises said corrosion resistant material.

11. The AO device of claim 10, wherein said cooling arrangement comprises a sandwich arrangement having said first and said second layer on opposite sides of said AO medium.

12. The AO device of claim 1, wherein said cooling arrangement comprises an article of said first material having at least one formed channel accepting region, said channel being formed entirely from said corrosion resistant material, wherein said channel is pressed in contact with said channel accepting region to effect thermal contact between said channel and said article.

13. The AO device of claim 1, wherein said device comprises a Q-switch, a modulator, a frequency shifter, an acousto-optic tuneable filters (AOTF) or a deflector.

14. The AO device of claim 13, wherein said AO device comprises said Q-switch and said Q-switch provides Q-switching in a Q-switched laser system, said Q-switched laser system further comprising a resonant cavity including a highly reflecting back mirror and a partially reflecting output coupler with a solid state laser with said cavity, wherein said Q-switch is within said cavity.

15. A corrosion resistant fluid cooled acousto-optic (AO) device, comprising:
   an AO interaction medium and a piezoelectric transducer affixed to said AO medium, and
   a cooling arrangement thermally coupled to said AO medium, said cooling arrangement comprising a first material, and at least one cooling conduit thermally contacting said first material formed from a second different material having an inlet and an outlet coupled thereto, said conduit providing a channel having an inner surface for flowing a coolant fluid therethrough, wherein said conduit includes a continuous corrosion resistant material layer over its entire area of said inner surface,
   wherein said conduit is entirely formed from said corrosion resistant material, said first material provides a specific acoustic impedance closer to a specific acoustic impedance of said AO medium as compared to said corrosion resistant material, a bulk thermal conductivity at 25 C of at least 75 W/m·K, and a specific acoustic impedance match between said first material and said AO medium is within a range of +/−50%.

16. The AO device of claim 15, wherein said conduit is <10% of a total mass of said cooling arrangement.

17. The AO device of claim 15, wherein said corrosion resistant material comprises stainless steel and said first material comprises aluminum or an aluminum alloy.

18. The AO device of claim 15, wherein said cooling arrangement is disposed on opposite sides of said AO medium.

19. A method of cooling an acousto-optic (AO) device comprising an AO interaction medium and a piezoelectric transducer affixed to said AO medium, comprising:

thermally coupling a cooling arrangement to said AO medium, said cooling arrangement comprising a first material, and at least one cooling conduit thermally contacting said first material formed from a second different material having an inlet and an outlet coupled thereto, said conduit providing a channel having an inner surface for flowing a coolant fluid therethrough, wherein said conduit includes a continuous corrosion resistant material layer over its entire area of said inner surface, wherein said first material provides a specific acoustic impedance closer to a specific acoustic impedance of said AO medium as compared to said corrosion resistant material, and a bulk thermal conductivity at 25 C of at least 75 W/m·K, and flowing a coolant through said channel during operation of said device.

20. The method of claim 19, wherein said cooling arrangement is disposed on opposite sides of said AO medium.

* * * * *